United States Patent
Onishi et al.

[11] Patent Number: 5,998,027
[45] Date of Patent: Dec. 7, 1999

[54] HEAT-RESISTANT, BENZIMIDAZOL POLYMER COATED FLAT ELECTRICAL WIRE

[75] Inventors: Yasuhiko Onishi; Shinichi Matsumoto, both of Yokkaichi, Japan

[73] Assignee: Sumitomo Wiring Systems, Ltd., Japan

[21] Appl. No.: 08/808,544

[22] Filed: Feb. 28, 1997

[30] Foreign Application Priority Data

Feb. 29, 1996 [JP] Japan ................................ 8-043031

[51] Int. Cl.⁶ .............................. B32B 15/00; B05D 5/12; H01B 7/00
[52] U.S. Cl. ................ 428/379; 428/383; 428/473.5; 427/118; 427/120; 427/372.2; 427/385.5; 427/359; 174/117 FF; 174/120 SR; 174/110 SR
[58] Field of Search ..................... 428/375, 379, 428/383, 473.5, 458; 427/118, 120, 372.2, 385.5, 359; 174/117 FF, 120 SR, 110 SR, 110 N; 528/342

[56] References Cited

U.S. PATENT DOCUMENTS

| | | |
|---|---|---|
| 2,929,744 | 3/1960 | Mathes et al. . |
| 2,989,491 | 6/1961 | Sattler et al. . |
| 3,528,852 | 9/1970 | Olson et al. . |
| 3,844,834 | 10/1974 | Jerson et al. . |
| 4,415,629 | 11/1983 | Palumbo et al. . |
| 4,447,797 | 5/1984 | Saunders et al. . |
| 5,061,554 | 10/1991 | Hjortsberg et al. . |
| 5,483,021 | 1/1996 | Saen et al. . |
| 5,674,614 | 10/1997 | Onishi et al. . |
| 5,725,953 | 3/1998 | Onishi et al. . |

FOREIGN PATENT DOCUMENTS

0566148A1 10/1993 European Pat. Off. .

Primary Examiner—William Krynski
Assistant Examiner—J. M. Gray
Attorney, Agent, or Firm—Jordan B. Bierman; Bierman, Muserlian and Lucas

[57] ABSTRACT

A flat electrical wire having a substantially rectangular cross-section is prepared from an electrical conductor having a circular cross-section, first by applying a benzimidazol-based polymer coat to the wire, then rolling the coated conductor to yield the flat wire. The flat wire thus prepared has a high heat resistance and dielectric breakdown resistance and can avoid dislocation or slippage when used in a magnet coil.

10 Claims, 3 Drawing Sheets

HEAT-RESISTANT, BENZIMIDAZOL POLYMER COATED FLAT ELECTRICAL WIRE

This Application claims the benefit of the priority of Japanese Application 8-43031, filed Feb. 29, 1996.

The present Invention relates to a flat heat-resistant electrical wire and process for the manufacture thereof. The flat electrical wire having a substantially rectangular cross-section (hereinafter "flat electrical wire") is applied, for example, to magnetic coils; the shape of the wire prevents it from dislocation or slippage caused by a variation in the magnetic field.

BACKGROUND OF THE INVENTION

There already exist flat wires such as polyimide coated wires; enamel-coated wires; highly heat-resistant, cementing enamel-coated wires, etc. In recent years, there has been great development in the miniaturization of electrical devices and high density assembly technology. This phenomenon has created a demand for the parts used in electrical devices to be heat-resistant. However, the maximum operating temperatures for polyimide coated flat wire; enamel-coated wire; or highly heat-resistant, cementing enamel-coated wire are 250° C., 150° C. to 220° C., and 220° C., respectively. This level of heat resistance is still not satisfactory for the above-mentioned requirements.

In a known flat wire manufacturing process, a cross-sectionally circular conductor is first rolled to give a flat conductor having an approximately rectangular cross-section. The flat conductor is then covered with a varnish solution and baked to give the flat coated conductor. A varnish solution of a benzimidazol-based polymer may be used in this known method to obtain a flat conductor coated with a reaction product of polymers of polybenzimidazol. However, applying a benzimidazol-based polymer varnish to a flat conductor does not always make it possible to obtain a uniform and homogeneous coating. In particular, the angle or corner portions of the flat conductor tend to have a thinner coating or to form pin holes, which makes the wire incapable of resisting high voltages. On the other hand, a process of first plating a cross-sectionally circular conductor and of rolling it thereafter to obtain a flat conductor is described in U.S. Pat. No. 5,483,021. However, this process relates to the plating of a corrosion-resistant material; the mechanical problem with which the Invention is concerned is not approached in this art.

SUMMARY OF THE INVENTION

It is, therefore, an object of the present Invention to provide a flat conductor or electrical wire that is highly heat resistant and devoid of the above-mentioned defects. Another object is to provide a convenient method of manufacturing such a flat conductor or electrical wire. The present Invention will be described primarily with relation to electrical wire, but it is understood that it is applicable to flat elongated elements generally.

The Invention provides a flat electrical wire having a substantially rectangular cross-section, said wire comprising a flat elongated element containing an electrically conductive part and an insulation coating, the coating being comprised of a benzimidazol-based polymer. Preferably, the benzimidazol-based polymer of the Formula I:

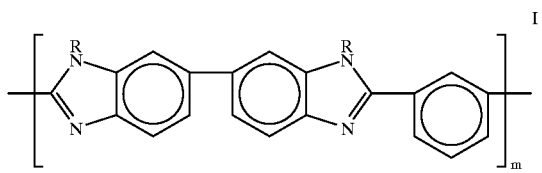

where R is selected from the group consisting of hydrogen and an alkyl group having 1 to 4 carbon atoms; and m is an integer equal to at least 5 and is chosen to yield solvent-soluble polymers. The Do preferred maximum value of m is about 3,500. The flat elongate element may be either an electrical wire or an electrical wire coated with an insulating layer.

The Invention also provides a method of producing the flat electrical wire. The method comprises:

a) dissolving at least one benzimidazol-based polymer in a solvent to form a varnish solution;

b) coating a round elongated element having a substantially circular cross-section with said varnish solution to form a varnished element;

c) heating the varnished element to form a coated element;

d) rolling the coated element thereby to form said substantially flat elongated element coated with said polymer, said flat element having a substantially rectangular cross-section.

Preferably, b) and c) are repeated until a coating of the desired thickness is obtained. It is also desirable that the solvent used in a) is an alkaline solvent. The method may further comprise the step of adding a radical-polymerization initiating agent to the varnish solution. Preferably, the benzimidazol-based polymer is of the Formula I as previously described herein. The elongated element having a substantially circular cross-section may be an electrical wire or an electrical wire coated with an insulation layer.

The Invention further provides a flat electrical wire having a substantially rectangular cross-section and resisting temperatures in excess of approximately 350° C. and high voltage, the wire comprising a flat elongated element containing an electrically conductive part and an insulation coating, the coating being comprised of at least one benzimidazol-based polymer. The flat electrical wire is the product of the process previously described and may be used (for example) in the electrical circuitry for aircraft, high voltage applications, communication, or for electric heaters.

Until now, no insulation coating has been available for use at a temperature exceeding 350° C. The insulation coating formed of benzimidazol-based polymers has a remarkable feature of withstanding temperatures in excess of 350° C., and even up to 760° C., although for a limited time. Further, conventional flat wire coated with a heat-resistant material could not be manufactured through the method according to the present Invention, for the coating effected on a round wire could not mechanically withstand a subsequent rolling. The method adopted for the present Invention efficiently and unexpectedly eliminates the defects known in the prior art.

BRIEF DESCRIPTION OF THE FIGURES

In the accompanying drawings, constituting a part hereof, and in which like reference characters indicate like parts

DETAILED DESCRIPTION OF THE INVENTION

Figure 1:
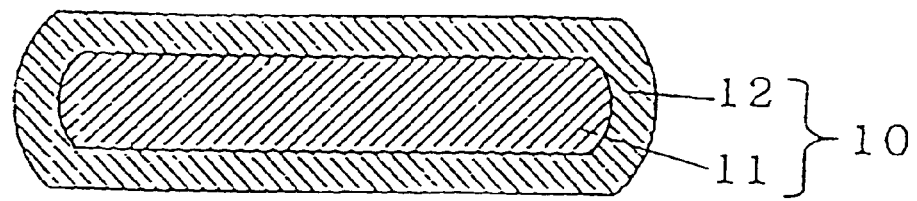
FIG. 1 is a cross-section of a flat electrical wire coated with the benzimidazol-based polymer according to the Invention.

FIG. 1 shows flat electrical wire 10 comprising conductive part 11, having a flat and substantially rectangular cross-section, and insulation coating 12 of a benzimidazol-based polymer (hereinafter PBI). Conductive part 11 may be copper wire, nickel-chromium wire, stainless steel wire, or other electrically conductive material.

The benzimidazol polymers are dissolved in a solvent to prepare the varnish solution. If the polymer has a low degree of polymerization, a radical-polymerization initiating agent may be added. The solvent for the varnish solution preparation includes basic solvents such as dimethylacetamide (DMA), dimethylformamide (DMF), pyridine, etc. or a hydrogen-bonding shielding solvent such as dimethylsulfoxide (DMSO), etc. The varnish concentration may vary from 1% to 80% by weight per unit volume, but is preferably in the range of 5% to 40% (w/v).

The radical-polymerization initiating agent may be, for example, benzoyl peroxide, lauroyl peroxide, di-t-butyrophthalate peroxide, azo-bis-isobutyronitrile, phenylazoalkylsulfonic acid, N-nitroso-N-acyl compounds, etc. The radical-polymerization initiator is added to the varnish solution to neutralize any polymerization-inhibiting agents present in the varnish solvent and to cause the molecules to stack. This addition may promote the cross-linking reaction of the polymers during the baking treatment to form a sufficiently resistant PBI coating.

Figure 2:
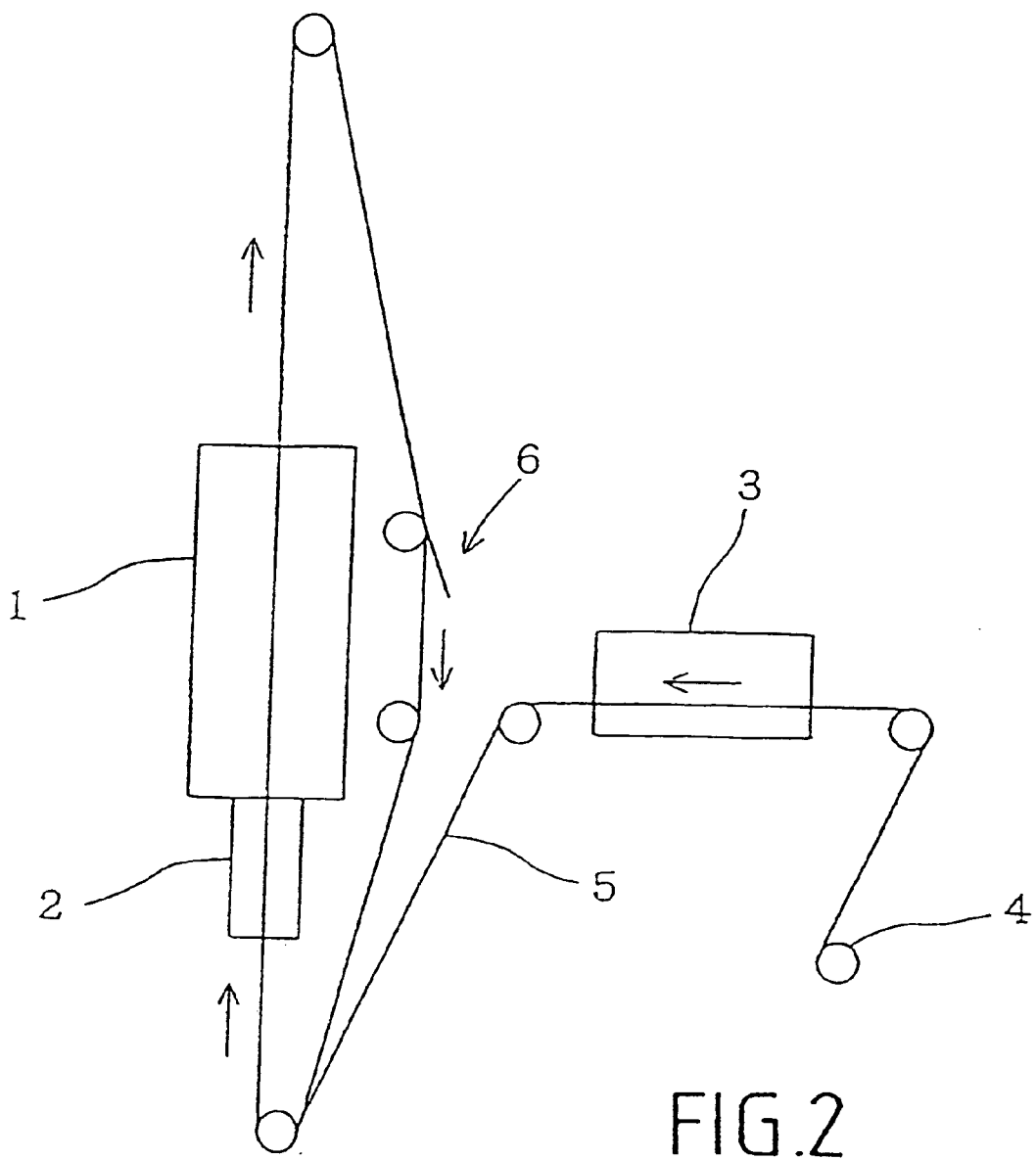
FIG. 2 is a schematic view of the process for varnish application to the wire and subsequent baking.
Figure 3:
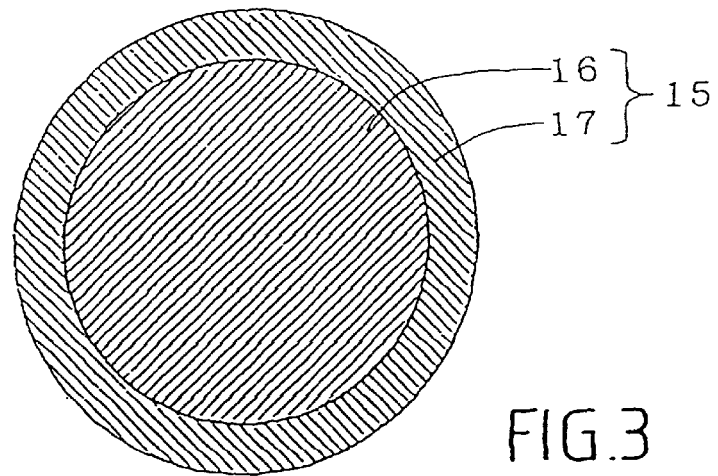
FIG. 3 is a cross-section of the coated circular electrical wire before rolling.

The varnish solution is applied to the surface of a cross-sectionally circular electrical wire and polymerized thereto by baking. These treatments are usually repeated. FIG. 2 shows a device for this purpose consisting of baking furnace 1, varnish applying unit 2, continuous annealing furnace 3, and coiling unit 4. Wire 5, such as a coated or uncoated electrical conductor, is uncoiled from coiling unit 4, annealed in continuous annealing furnace 3, passed through varnish applying unit 2 where the varnish solution is applied to the wire, and then sent to baking furnace 1, where the benzimidazol polymer is heated to form the PBI coating. Varnish-baked wire 5 is repeatedly processed through varnish applying unit 2 and baking furnace 1. As shown in FIG. 3, cross-sectionally circular electrical wire 15, having conductive part 16 and PBI coating 17, is then taken from delivering unit 6.

According to general handling processes, when conductor part 16 has a diameter less than 0.6 mm, the varnish applying unit may be a horizontal furnace; however, when the diameter is larger than 0.6 mm, a vertical furnace may be used. Thus, the type of furnace is chosen depending on circumstances. One may also appropriately modify the application frequency, the baking temperature, the varnish applying speed, etc. according to the type of varnish solution to be baked, the type of baking furnace, and the like. The application frequency may vary from once to several hundred times but, more appropriately, is from 2 to 20 times. The baking temperature is desirably between room temperature and 1000° C., preferably between 500° C. and 800° C. The cross-sectionally circular electrical wire 15 is then rolled to obtain flat electrical wire 10 having an approximately rectangular cross-section.

Figure 4:
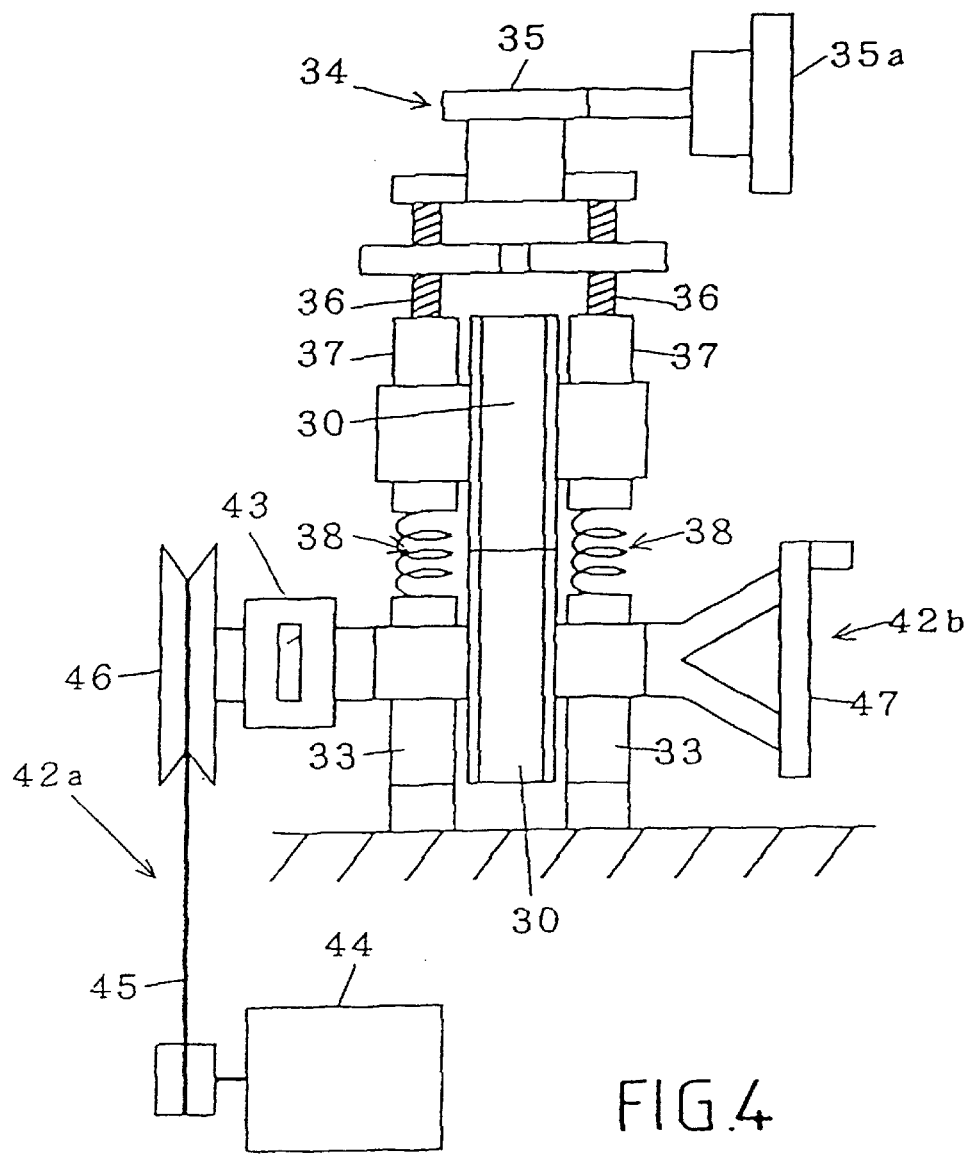
FIG. 4 shows a device for rolling the circular electrical wire of FIG. 3.
Figure 5:
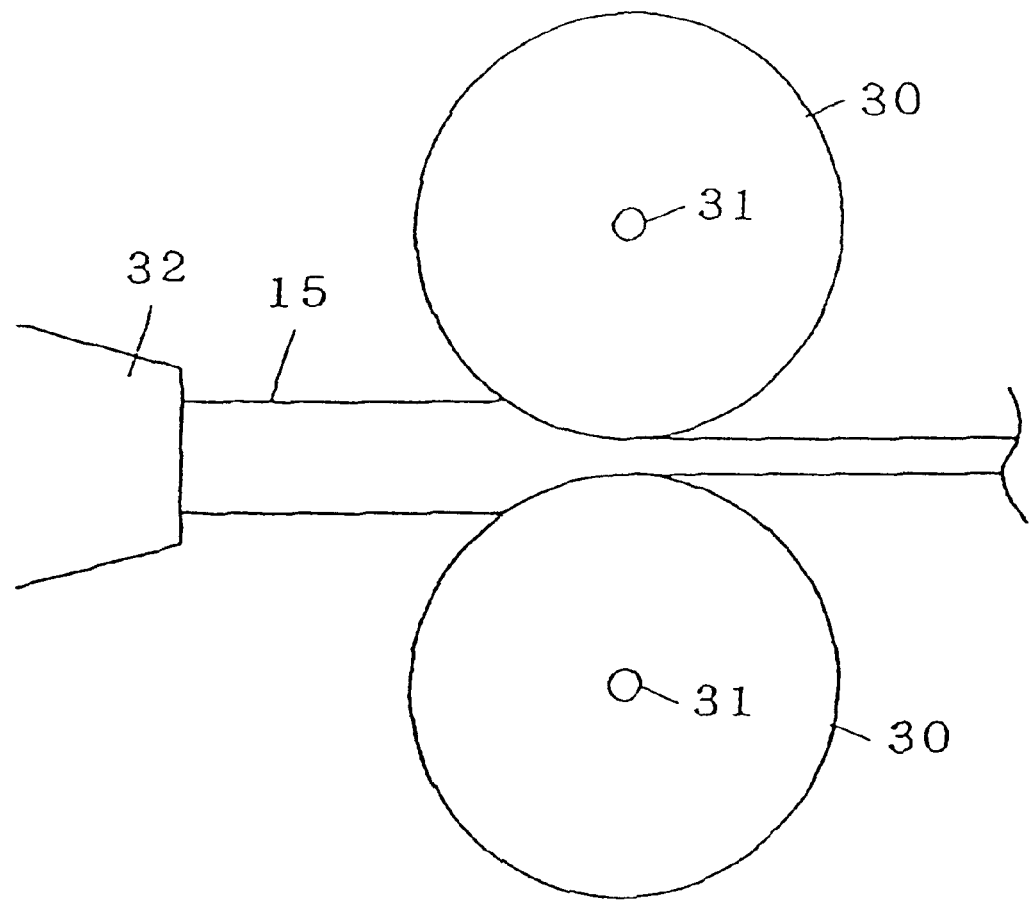
FIG. 5 shows a schematic view of the wire being rolled.

An example of a rolling device for the electrical wire having a circular cross-section is shown in FIGS. 4 and 5. The device comprises paired upper and lower rolls 30, adjusting mechanism 34 for varying the distance between the rolls, elastic means 38 fixed between the roll axles, and driving mechanisms 42a and 42b for rotating lower roll 30. Rolls 30 are made of super-hard material such as a ceramic-metal composite and are mounted on a pair of parallel axles 31. Ceramic nozzle 32 is provided in front of the rolls so that the tip of the nozzle can feed the wire into the gap therebetween as shown in FIG. 5. Lower roll 30 is held in a pair of lower supporting units 33 through axle 31 and one end of axle 31 is linked to motor-driven rotating mechanism 42a through coupling unit 43, while the other end of axle 31 is linked to manual rotating mechanism 42b.

Motor-driven rotating mechanism 42a transmits the movement of motor 44 to pulley 46 through transmission belt 45, the motion of pulley 46 is then transmitted to lower roll 30. Manually-driven mechanism 42b has crank handle 47; by operating this handle, the operator can rotate lower 30 by hand if desired.

Upper roll 30 is held in a pair of upper supporting units 37 through axle 31. Units 37 are held by adjusting mechanism 34 so that they can be moved up or down. Adjusting mechanism 34 consists of a pair of adjusting rods 36 extending upwardly from upper supporting units 37, and gear mechanism 35 which transmits rotation of manual handle 35a to the pair of rods 36. These rods have a tapped surface, their bottom ends being connected to upper supporting units 37, and their top ends are connected to gear mechanism 35. When handle 35a is rotated, rods 36 turn so that supporting units 37 move up or down depending on the rotating direction. In this way, the gap between rolls 30 is adjusted and controlled. Elastic means 38, between the upper and the lower supporting units, comprises a spring and urges rolls 30 upward as seen in FIG. 4. In this way, when adjusting the distance between the rolls, manual handle 35a is more easily operated.

As shown in FIG. 5, the nip between rolls 30 is preset by adjusting mechanism 34. Lower roll 30 is rotated by motor-driven mechanism 42a or manually-driven mechanism 42b. Round cross-section wire 15, coated with PBI, is fed between the rolls from ceramic nozzle 32. Wire 15 passes between rolls 30 due to rotation of lower roll 30. Friction between wire 15 and upper roll causes it to also rotate. Thus, the wire is continuously rolled by rolls 30 to yield flat wire 10 as shown in FIG. 1. The distance between rolls 30 is appropriately adjusted depending on the desired thickness of the flat wire to be manufactured.

Flat wire 10 thus manufactured has a high heat resistance due to the PBI polymer coating 12 and a high voltage resistance because of the uniformity thereof. This uniformity or homogeneity of the coating is due to the fact that varnish application and baking are effected on the round-section wire 15 before rolling, instead of on the flat wire 10 after the rolling. Furthermore, this manufacturing method has a cost advantage over the prior art method.

It is to be stressed that the above manufacturing method, i.e. first coating on the round wire, then rolling to yield flat wire, is not appropriate for making the conventional heat-resistant coated wire such as polyimide-coated flat wire, enamel-coated flat wire, or cementing enamel-coated flat wire. This results from the fact that the insulating materials used for the conventional flat wires have a lower mechanical resistance. Rolling such a material after coating in many cases causes cracks in the insulating coating. On the other hand, as shown in Table 1, the PBI coating 12 according to the Invention has sufficient strength and can be rolled after its application to the round wire without the risk of forming cracks.

Figure 6:
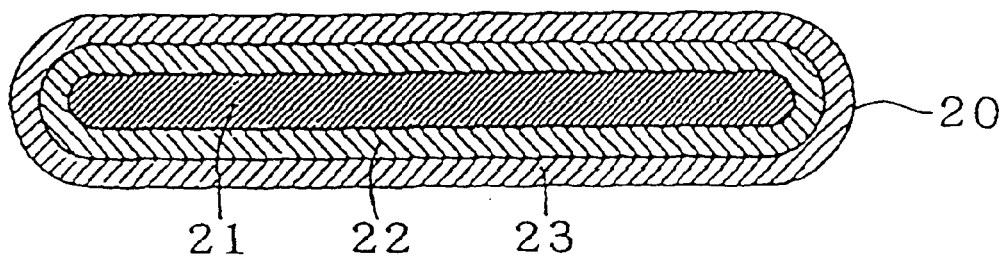
FIG. 6 is a view, similar to that of FIG. 1, of an insulation-layer coated, flat electrical wire, further coated with a benzimidazol-based polymer according to the Invention.

As shown in FIG. 6, flat wire 20 may also comprise intermediate insulation coating 22, in addition to flat conductor 21 having a substantially rectangular cross-section, and exterior PBI coating 23. This type of wire also shows a high heat-resistance. Coating 22 is advantageously made of polyimide, enamel, or the like.

EXAMPLE 1

A nickel-plated copper wire having an external diameter of 0.5 mm was soaked in a varnish solution consisting of 30 parts benzimidazol polymer and 70 parts of solvent DMA, the varnish solution further comprising 0.1% (w/v) of AIBN initiator. The varnish was applied to the wire and adhered thereto by baking at a line speed of 50 m/min at 600° C. to form the PBI coated wire. The above procedure was repeated 8 times to obtain a PBI coated, nickel-plated copper wire having a circular cross-section. This wire was rolled by the device of FIG. 4 to obtain a flat wire having a thickness to width ratio of 1:10.

EXAMPLE 2

A nickel-plated copper wire having an external diameter of 0.5 mm was soaked in a varnish solution consisting of 30 parts of the polymer of Example 1, 60 parts of solvent DMA, and 10 parts of DMSO, the varnish solution further comprising 0.1% (w/v) of AIBN initiator. The varnish was applied to the wire by baking at a line speed of 20 m/min at 600° C. to form the PBI coated wire. The above procedure was repeated 8 times to obtain a PBI coated, nickel-plated copper wire having a circular cross-section. The wire was rolled by the device of FIG. 4 to obtain a flat wire having a thickness to width ratio of 1:5.

EXAMPLE 3

An oxygen-free copper wire having a diameter of 0.36 mm was soaked in a varnish solution consisting of 20 parts of the polymer of Example 1 and 80 parts of solvent DMA. The varnish was applied to the wire by.baking at a line speed of 10 m/min at 500° C. to form the PBI coated wire. The above procedure was repeated 10 times to obtain a PBI coated, oxygen-free copper wire having a circular cross-section. The wire was rolled by the device of FIG. 4 to obtain a flat wire having a thickness to width ratio of 1:20.

EXAMPLE 4

A nickel-plated copper wire having an external diameter of 1.5 mm was soaked in varnish solution consisting of 55 parts of the polymer of Example 1 and 45 parts of solvent DMA. The varnish was applied to the wire by baking at a line speed of 60 m/min at 700° C. to form the PBI coated wire. The above procedure was repeated 20 times to obtain a PBI coated, nickel-plated copper wire having a circular cross-section. The wire was rolled by the device of FIG. 4 to obtain a flat wire having a thickness to width ratio of 1:4.

EXAMPLE 5

A nickel-plated copper wire having an external diameter of 2.5 mm was soaked in a varnish solution consisting of 65 parts of the polymer of Example 1 and 35 parts of solvent DMA. The varnish was applied to the wire by baking at a line speed of 30 m/min at 600° C. to form the PBI coated wire. The above procedure was repeated 15 times to obtain a PBI coated, nickel-plated copper wire having a circular cross-section. The wire was rolled by the device of FIG. 4 to obtain a flat wire having a thickness to width ratio of 1:5.

EXAMPLE 6

A nickel-copper alloyed steel wire having a diameter of 1.5 mm processed according to Example 1 except that the varnish solution consisted of 55 parts of polymer PBI and 45 parts of solvent DMA. The varnish was baked onto the wire at a line speed of 30 m/min at 500° C. to form the PBI coated wire. The above procedure was repeated 20 times to obtain a PBI coated, nickel-copper alloyed steel wire having a circular cross-section. The wire was rolled by the device of FIG. 4 to obtain a flat wire having a thickness to width ratio of 1:10.

EXAMPLE 7

An $Nb_3$-Sn alloyed steel wire having a diameter of 1.5 mm was soaked in a varnish solution consisting of 55 parts of the polymer of Example 1 and 45 parts of solvent DMA. The varnish was applied to the $Nb_3$-Sn alloyed steel wire by. baking at a line speed of 30 mn/min at 500° C. to form the PBI coated wire. The above procedure was repeated 20 times to obtain a PBI coated, $Sb_3$-Sn alloyed steel wire having a circular cross-section. The wire was rolled by the device of FIG. 4 to obtain a flat wire having a thickness to width ratio of 1:3.

EXAMPLE 8

A Va-Ga alloyed steel wire having a diameter of 1.5 mm was soaked in a varnish solution consisting of 55 parts of the polymer of Example 1 and 45 parts of solvent DMA. The varnish was applied to the Va-Ga alloyed steel wire by baking at a line speed of 30 m/min at 500° C. to form the PBI coated wire. The above procedure was repeated 20 times to obtain a PBI coated wire having a circular cross-section. The wire was rolled by the device of FIG. 4 to obtain a flat wire having a thickness to width ratio of 1:3.

EXAMPLE 9

An Nb-Ti alloyed steel wire having a diameter of 1:5 mm was soaked in a varnish solution consisting of 55 parts of the polymer of Example 1 and 45 parts of solvent DMA. The varnish was applied to the Nb-Ti alloyed steel wire by baking at a line speed of 30 m/min at 500° C. to form the PBI coated wire. The above procedure was repeated 20 times to obtain PBI coated wire having a circular cross-section. The wire was rolled by the device of FIG. 4 to obtain a flat wire having a thickness to width ratio of 1:3.

EXAMPLE 10

An $Nb_3$-Al alloyed steel wire having a diameter of 1.5 mm was soaked in a varnish solution consisting of 55 parts of the polymer of Example 1 and 45 parts of solvent DMA. The varnish was applied to the $Nb_3$-Al alloyed steel wire by baking at a line speed of 30 m/min at 500° C. to form the PBI coated wire. The above procedure was repeated 20 times to obtain a PBI coated wire having a circular cross-section. The wire was rolled by the device of FIG. 4 to obtain a flat wire having a thickness to width ratio of 1:3.

EXAMPLE 11

A nickel-chromium (20%) alloyed steel wire having a diameter of 0.36 mm was soaked in a varnish solution consisting of 20 parts of the polymer of Example 1 and 80 parts of solvent DMA. The varnish was applied to the Ni-Cr alloyed steel wire by baking at a line speed of 10 m/min at 500° C. to form the PBI coated wire. The above procedure was repeated 10 times to obtain a PBI coated wire having a circular cross-section. The wire was rolled by the device of FIG. 4 to obtain a flat wire having a thickness to width ratio of 1:4.

EXAMPLE 12

A tungsten (W) wire having a diameter of 0.36 mm was soaked in a varnish solution consisting of 20 parts of the polymer of Example 1 and 80 parts of solvent DMA. The varnish was applied to the tungsten (W) wire and adhered thereto by baking at a line speed of 10 m/min at 500° C. to form the PBI coated wire. The above procedure was repeated 10 times to obtain a PBI coated wire having a circular cross-section. The wire was rolled by the device of FIG. 4 to obtain a flat wire having a thickness to width ratio of 1:3.

Table 1 sets forth certain characteristics of the PBI used in the foregoing Examples. Tables 2 and 3 show comparisons of certain features of the samples before and after processing. Dielectric breakdown testing of the PBI coated flat wire before aging was performed by applying an alternating current voltage for 1 minute, in accordance with JIS-C-3005. Thermal shock testing was carried out at 220° C. for 30 minutes after the sample was elongated by 20%. Wear-resistance testing was effected under a load of 4N, in accordance with JASO D611. Table 3 also shows the results of dielectric breakdown tests after aging at 250° C. for 168$h$, effected on the samples of Examples 1 to 3. Tables 2 and 3 thus indicate that the samples according to the Invention have a high heat resistance and also a high dielectric breakdown resistance.

While only a limited number of specific examples of the present Invention have been expressly disclosed, it is, nonetheless, to be broadly construed and not to be limited except by the character of the claims appended hereto.

TABLE 1

| | | |
|---|---|---|
| Tensile Strength | ASTMD638 | 1,632 kgf/cm$^2$ |
| Modulus of Elasticity in Tension | ASTMD638 | 60,180 kgf/cm$^2$ |
| Flexural Strength | ASTMD790 | 2,240 kgf/cm$^2$ |
| Modulus of Elasticity in Flexure | ASTMD790 | 66,300 kgf/cm$^2$ |
| Compressive Strength | ASTMD695 | 4,080 kgf/cm$^2$ (12%*) |
| Modulus of Elasticity in Compression | ASTMD695 | 63,240 kgf/cm$^2$ |

*Strain % at yield point
(Based on the standard test ASTM)

TABLE 2

| PBI circular-section wire | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| PBI-finished wire outer diameter (mm) | 0.516 | 0.511 | 0.401 | 1.518 | 2.520 | 1.519 | 1.520 | 1.518 | 1.520 | 1.519 | 0.402 | 0.403 |
| PBI coating thickness (mm) | 0.008 | 0.0055 | 0.0205 | 0.009 | 0.010 | 0.008 | 0.010 | 0.009 | 0.010 | 0.008 | 0.0210 | 0.0215 |
| Dielectric breakdown (kV)* without ageing (in air) | 2.1 | 2.2 | 3.5 | 2.2 | 3.5 | 2.1 | 3.2 | 2.2 | 3.4 | 2.1 | 2.2 | 3.5 |

*Voltage at breakdown, attained by increasing the voltage at a rate of 500 V/min using alternating current.

TABLE 3

| PBI flat wire | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Finished width (mm) | 1.235 | 0.865 | 1.358 | 2.298 | 4.266 | 3.636 | 2.318 | 2.316 | 2.318 | 2.314 | 0.497 | 0.585 |
| Finished thickness (mm) | 0.124 | 0.173 | 0.068 | 0.575 | 0.853 | 0.364 | 0.783 | 0.781 | 0.783 | 0.781 | 0.124 | 0.217 |
| Average PBI coating thickness (mm) | 0.0034 | 0.0031 | 0.0063 | 0.0058 | 0.0055 | 0.0036 | 0.008 | 0.007 | 0.008 | 0.006 | 0.010 | 0.0165 |
| Dielectric breakdown (kV)* without ageing (in water) | 1.1 | 1.2 | 1.5 | 1.2 | 1.5 | 1.1 | 1.4 | 1.1 | 1.4 | 1.1 | 1.2 | 1.5 |
| Dielectric breakdown (kV)* after ageing | 2.0 | 2.1 | 3.4 | | | | | | | | | |
| Thermal shock** (elongation melhoc) | OK | OK | OK | OK | OK | OK | OK | OK | OK | OK | OK | OK |
| Wear resistance*** (use frequencies) | 1040 | 940 | 950 | 945 | 950 | 845 | 945 | 950 | 845 | 945 | 950 | 845 |

*Voltage at breakdown, attained by increasing the voltage at a rate of 500 V/min using alternating current.
**Cracking evaluated after the sample was elongated by 20%, maintained in this state at 220° C. for 30 minutes, and returned to room temperature.
***Reciprocation counts attained before a reciprocating blade under a load of 4N traverses through a coating (standard test, JASO, D611).

What we claim is:

1. A flat elongated element having a substantially rectangular cross-section, said element comprising an electrical wire having an insulating coating thereon, said coating comprising a polymer based on a benzimidazol monomer, said element produced by a method comprising
   a) dissolving a benzimidazol-based polymer in a solvent to form a varnish solution;
   b) coating a round electrical wire element having a substantially circular cross-section with said varnish, thereby forming a varnish element;
   c) heating said varnish element to form a coated element, said coated element being coated with said benzimidazol-based polymer;
   d) thereafter rolling said coated element to form said substantially flat elongated element coated with said polymer.

2. The flat electrical element according to claim 1 wherein said benzimidazol-based monomer is of the Formula

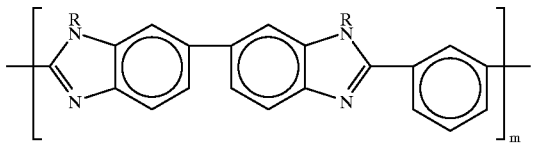

wherein R is selected from the group consisting of hydrogen and an alkyl group having 1 to 4 carbon atoms; and m is an integer equal to at least 5 and is chosen to yield solvent-soluble polymers.

3. The flat elongated element of claim 1 wherein said electrical wire is coated with an insulating layer prior to coating with said varnish.

4. A method of manufacture of a flat elongated element having a substantially rectangular cross-section, said element comprising an electrical wire having an insulating coating thereon, said coating comprising a polymer based on a benzimidazol monomer, said method comprising
   a) dissolving at least one benzimidazol-based polymer in a solvent to form a varnish solution;
   b) coating a round electrical wire element having a substantially circular cross-section with said varnish solution to form a varnish element;
   c) heating said varnish element to form a coated element;
   d) thereafter rolling said coated element thereby to form said substantially flat elongated element coated with said polymer.

5. The method of claim 4 wherein b) and c) are repeated at least once.

6. The method of claim 4 wherein said solvent is an alkaline solvent.

7. The method of claim 6 wherein further comprising adding a radical-polymerization initiating agent to said varnish solution.

8. The method of claim 4 further comprising adding a radical-polymerization initiating agent to said varnish solution.

9. The method of claim 4 wherein said benzimidazol-based polymer is of Formula I:

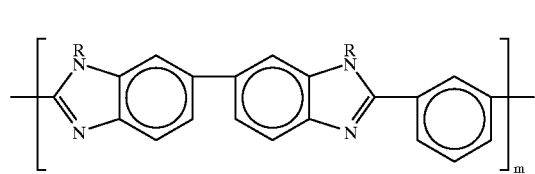

10. The method of claim 4 wherein said electrical wire is coated with an insulating layer Drior to coating with said varnish.

* * * * *